United States Patent [19]
Kurata et al.

[11] 3,812,965
[45] May 28, 1974

[54] METHOD FOR AUTOMATICALLY SORTING BLOCK-TYPE OBJECTS OF DIFFERENT CATEGORIES AND APPARATUS THEREFOR

[75] Inventors: Yutaka Kurata, Iwata; Motoji Iwata, Hamamatsu, both of Japan

[73] Assignee: Nippon Gakki Seizo Kabushiki Kaisha, Hamamatsu-shi, Japan

[22] Filed: Mar. 21, 1972

[21] Appl. No.: 236,755

[30] Foreign Application Priority Data
Mar. 25, 1971  Japan.............................. 46-16841
Mar. 25, 1971  Japan.............................. 46-16840

[52] U.S. Cl. .............................. 209/74 M, 214/11
[51] Int. Cl. .............................................. B07c 3/02
[58] Field of Search........ 209/74, 74 M, 73; 214/11, 214/11 A, 11 M; 198/38

[56] References Cited
UNITED STATES PATENTS
3,100,040  8/1963  Kleist ........................... 214/11 R X
3,397,392  8/1968  Henig ........................... 214/11 R X

*Primary Examiner*—Richard A. Schacher
*Attorney, Agent, or Firm*—Cushman, Darby & Cushman

[57] ABSTRACT

A lumber or like objects sorting apparatus is arranged to be operative so that at the time block-type objects of various different categories are loaded, at different sites, on a single main conveyor in succession without the objects being superposed one upon another, the information of both the categories of the objects to be sorted and the positions at which the objects were loaded on the main conveyor is registered in a memorizer, and that, as the objects are carried along on this conveyor, they are unloaded — at the signal coming from the memorizer — off the main conveyor when these objects arrive at their respective designated positions of removal for the respective categories. Thus, it is possible to automatically deliver the sorted objects at their designated positions of removal, i.e., onto the designated classified individual receptacles.

11 Claims, 9 Drawing Figures

METHOD FOR AUTOMATICALLY SORTING BLOCK-TYPE OBJECTS OF DIFFERENT CATEGORIES AND APPARATUS THEREFOR

BACKGROUND OF THE INVENTION

Field of the Invention

The present invention is concerned with a method and an apparatus for automatically sorting block-type objects of various different categories into groups of the respective individual categories.

In particular, the present invention pertains to a method and an apparatus for automatically sorting into groups of individual categories those pieces of lumber which have been sawed into various different dimensions by a plurality of sawing machines.

Description of the Prior Art

In sorting out a number of block-type objects differring in categories with each other, it would be rather easy to automatize the sorting operation, if the sorting is performed in accordance with only the simple factors peculiar to the objects per se.

However, in a saw mill where a number of sawing machines are used for sawing logs of various wood kinds into lumbers of various dimensions, the sorting of sawed lumbers according to the respective wood kinds and dimensions after sawing of logs by individual sawing machines required a number of operators assigned to sort out the boards coming out from the individual sawing machines in addition to many sawing machine operators in a number at least corresponding to the number of the sawing machines. In these operations, however, there have been encountered the inconveniences that the board sorting operators are positioned at substantial distances from the sawing machine operators so that the intentions or signals of the sawing machine operators often failed to be transmitted correctly to the board sorting operators owing to the reasons such as the big noises produced at the time of sawing logs, resulting in frequent occurrence of mistakes in the proper sorting of boards.

In order to avoid such inconveniences, proposals have been made to perform the sorting of boards by the use of a sorting apparatus. However, it has been difficult to apply a single sorting apparatus in common to a plurality of sawing machines. Eventually, therefore, it was considered that board sorting operators were necessary anyhow. Thus, there has been the drawback in the past that the intensions or signals of the board sorting operators did not necessarily come into agreement with the intensions of the respective sawing machine operators. Apart from this, the respective sorting apparatuses of the prior art required means for associating these apparatuses with each other. This contributed to a further complication of the mechanisms of the saw mill equipment as a whole and led to frequent occurrence of disorders of the equipment. Thus, these prior proposals lacked practicability.

SUMMARY OF THE INVENTION

It is, therefore, a primary object of the present invention to provide a method and an apparatus for automatically sorting block-type objects differring in category into groups of objects of the respective categories.

Another object of the present invention is to provide a method and an apparatus for automatically performing operations of loading block-type objects different in category on a main conveyor from a plurality of side conveyors, and of sorting out these objects into groups of the individual categories at positions of removal located downstream of the main conveyor for the respective categories.

Still another object of the present invention is to provide an apparatus suitable for putting the method of the present invention into practice in automatically sorting out block--type objects, which is relatively simple in structure and is capable of accomplishing the sorting with certainty.

A yet another object of the present invention is to provide a method and an apparatus for automatically accurately and positively sorting, into groups of individual categories, individual boards after they are supplied onto a main conveyor from a plurality of side conveyors as being boards of different categories.

A further object of the present invention is to provide a method and an apparatus for performing automatically a series of operations, i.e.: generating signals for determining — during or immediately before or immediately after the logs are sawed into boards of various sizes by a plurality of sawing machines — the sites at which these individual boards are to be unloaded from the conveyor according to the respective categories; electrically memorizing these signals in a memorizer; and automatically sorting and discharging, at the signal from the memorizer, the individual boards from the conveyor onto the designated receptacles at the time these boards arrive at the positions of the receptacles.

BRIEF DESCRIPTION OF THE DRAWINGS

FIGS. 1 and 2 are somewhat diagrammatic explanatory illustrations to show the basic conception of the present invention, in which:

FIGS. 5 to 9 are somewhat diagrammatic representations to explain an embodiment of the present invention, in which:

DETAILED DESCRIPTION OF THE PREFERRED EMBODIMENT

Description will be made first on the basic conception of the present invention by referring to FIG. 1.

The apparatus of the present invention which is suitable for putting the method of the invention into practice comprises conveyor means 1 running at a constant speed and having a plurality of equally spaced partitions 101 for carrying the objects, two loading stations 2 provided in the upstream of the conveyor means 1, three unloading stations 3 provided in the downstream of the conveyor means 1, category signal generators 4 provided respectively corresponding to the loading stations 2, and memory means 5.

The memory means 5 comprises memory medium 501, write-in heads 502, 502, ..., read-out heads 503, 503, ..., and an eraser head 504. Assuming that the conveyor means 1 moves in the direction indicated by the arrow 100 in FIG. 1, the memory medium 501 is adapted to rotate in the direction of the arrow 500 in FIG. 1 in synchronism with the speed of travel of the conveyor means 1. The write-in heads 502 and the read-out heads 503 are respectively located with respect to the memory medium at the respectively same positions as the loading stations 2 and the unloading stations 3 are respectively located with respect to the conveyor 1. Each of the read-out heads 503 is assigned to respective one category to read only those signals indicative of the assigned category out of all the category indicative signals written on the memory medium 501.

At the loading station 2, block-type objects which are to be sorted out are loaded on the partitions of the conveyor means 1 in such a manner that an object or objects of one category is loaded in one partition without causing superposition of any objects of different categories on the previously loaded ones in a particular partition. Category signal generators (hereinafter to be referred to simply as CSG) 4,4, .... provided at the respective sites of the loading stations 2 generate signals indicative of the categories of the block-type objects from the positions at which these objects are loaded on the conveyor means 1. Electric connections are arranged between the CSG's 4, 4, .... and the write-in heads 502, 502, .... in such a way that one write-in head 502 corresponds to one CSG 4.

Each of the unloading stations 3 includes, in a number at least corresponding to the number of the categories of sorting, a receptacle 301 and a delivery means 302 for removing the object from the conveyor 1 to the receptacle 301.

Electric connections are arranged between the delivery means 302, 302, .... and the read-out heads 503, 503, .... in such a manner that one read-out head 503 corresponds to one delivery means 302.

Let us now assume that block-type objects which are to be sorted out are loaded on the conveyor means 1 at two separate loading stations 2 without causing superposition of objects of one category upon another. Upon their loading, the signal representing the category of the object loaded in the form of, for example, a coded signal is derived from the CSG at the position of each object being loaded on the conveyor means 1, and is stored by means of the corresponding write-in head 502 on the memory medium 501. The series of memory elements of the recording medium 501 are running forwardly, making a circular revolution, in synchronism with the travel of the conveyor means 1. As mentioned before, an arrangement is provided so that the respective positions of the read-out heads 503, 503, .... with respect to the respective elements in the recording medium 501 and the positions of the respective delivery means 302, 302, ... relative to the respective partitions 101 in the conveyor means 1 are both preliminarily established to insure exact coincidence between the time at which the individual signal carrying elements of the menory medium 501 arrive at the respective read-out heads 503, 503, .... and the time at which the individual block-type object-carrying partitions of the conveyor 1 arrive at their corresponding respective delivery means 302, 302, ...... When the objects of categories A, C and B are respectively loaded in the partitions as shown in FIG. 1, the category indicating signals are memorized on the memory medium 501 as shown by A, C and B in FIG. 1. Accordingly, when a category signal carrying element of the running memory medium 501 arrives at a particular readout head 503 which is assigned to that category, the head 503 reads out the signal carried by this element of the memory medium 501 and triggers the corresponding delivery means 302 to cause the corresponding block-type object to be unloaded from the conveyor 1 at the designated site of removal. The object which is unloaded thereat is received in its mating specific receptacle 301 which is disposed subjacently of the conveyor means 1. The present invention contemplates automatic sorting out of block-type objects which are different in category relative to each other, in the manner described above.

Figure 2:
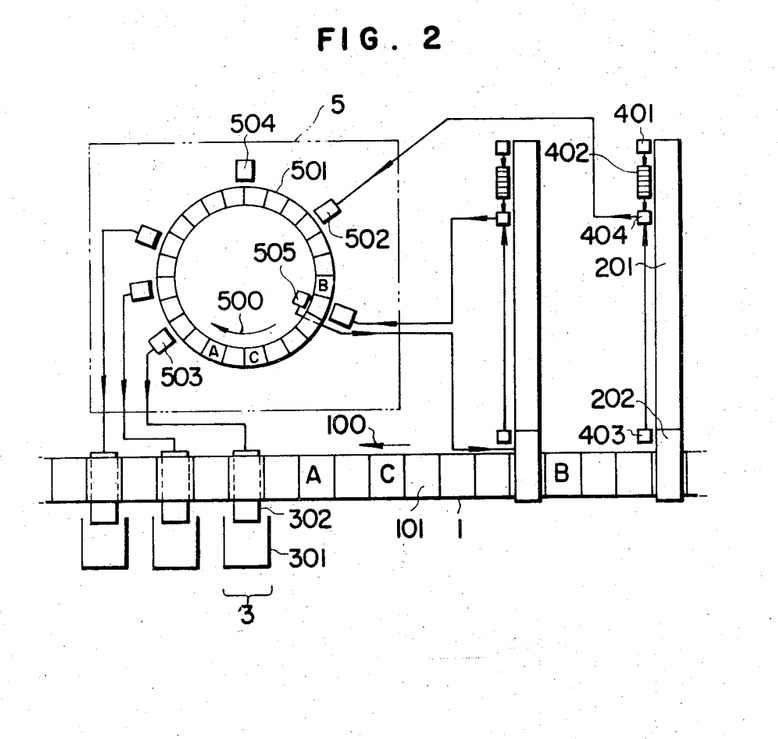
FIG. 2 is an explanatory illustration of a modification of the basic conception shown in FIG. 1 in which some other elements are added to the elements of the basic conception to perform automatic sorting out of objects delivered from a plurality of branch conveyors or passageways.

Next, description will be directed to the conception for automatically sorting out block-type objects which are delivered from a plurality of branch conveyors or passageways, by referring to FIG. 2.

Figure 1:
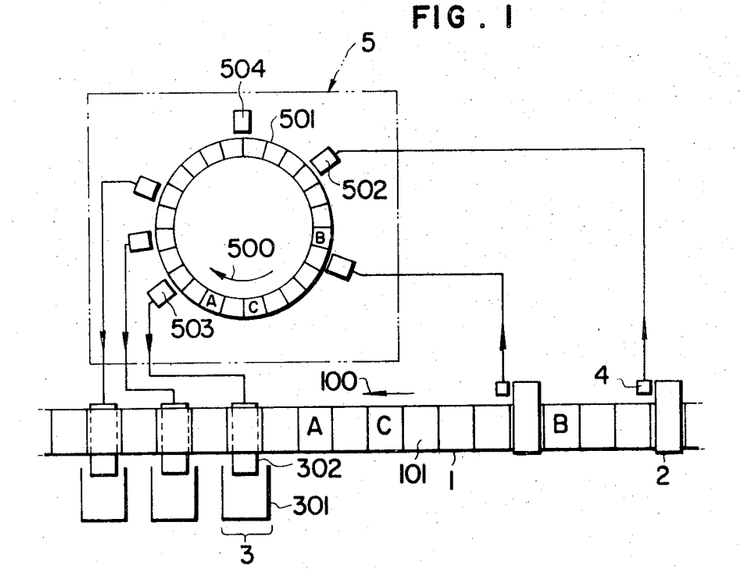
FIG. 1 is an explanatory illustration with respect to the basic conception.

The manner in which the block-type objects are sorted out according to the conception shown in FIG. 2 is not much different in principle from the manner shown in FIG. 1. The only difference lies in the fact that, a plurality of branch conveyors or passageways 201, 201, ... with transfer means 202, 202 ... at the respective end thereof are additively provided abjacent to the main conveyor means 1 and that the category signal generator is comprised of a category signal initiator 401, a shift register 402, a transfer detector 403 and a transfer gate 404. An empty detector head 505 is provided in a pair with the write-in head 502 (except the first one) and connected to the corresponding transfer means 202 thereby allowing the transfer means 202 to transfer the object carried there by the branch conveyor 201 only when the head 505 detects from the memory medium 501 that the now passing partitions of the conveyor 1 is empty.

Let us now assume that block-type objects which are required to be sorted are supplied to a plurality of branch conveyors or passageways 201, 201, ....., respectively. At the same time with this supply, there is initiated — from the respective category signal initiators 401, 401, ... — signals indicative of the categories of the block-type objects loaded on the branch conveyors, and this signal is trnasmitted to the shift registers 402, 402, ... , and is memorized and registered therein successively in this order. When the object reaches the end of the branch conveyor, i.e., the transfer means 202, the object is loaded on the first come empty partition 101 of the conveyor 1. At the time that these objects are transferred onto the conveyor means 1, a gating signal indicating that the object is loaded on the main conveyor 1 at that transfer means 202 is generated from the transfer detector 403 to open their corrdsponding transfer gate 404 to transmit the earliest registered category signal in the shift register 402 to the corresponding write-in head 502. Accordingly, there will be memorized the category signal at the corresponding position on the memory medium 501. In this way these individual category signals are re-arranged on the memory medium 501 in the sequential order of transfer of the objects from the branch conveyors onto the main conveyor 1.

Since the block-type objects are now being carried without superposition on the main conveyor 1 in the same manner as stated in connection with FIG. 1, the objects can be automatically sorted out in accordance with the respective categories.

With respect to the manner of operation in which the block-type objects are transferred without superposition onto the main conveyor 1 with the aid of the detector head, its explanation will be made later in connection with an embodiment of the present invention.

Figure 3:
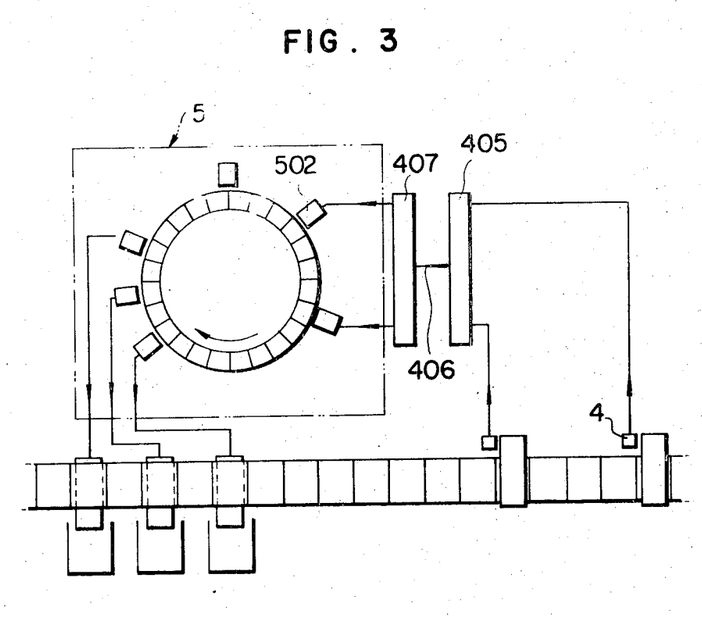
FIGS. 3 and 4 are illustrations representing minor modifications of FIGS. 1 and 2, respectively.
Figure 4:
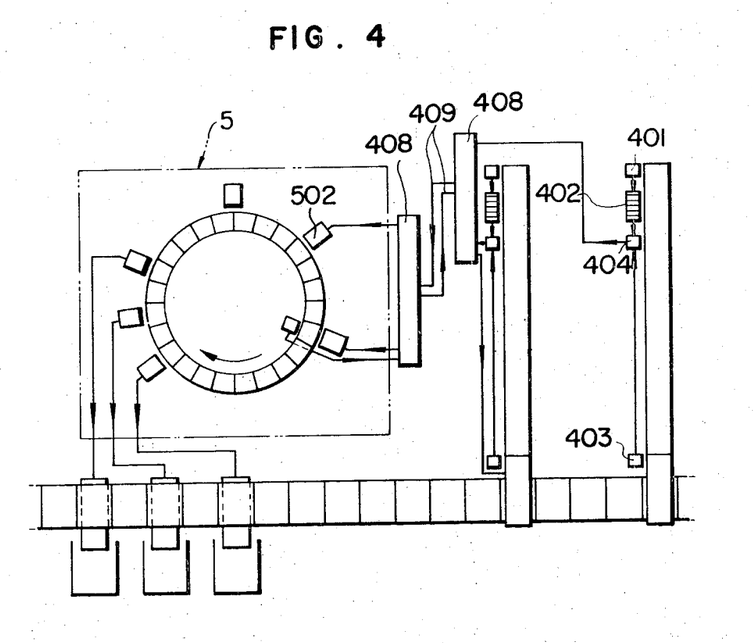

If the memory means 5 is located far from the category signal generators 4, the respective connections between the generators 4 and the write-in heads 502 are not advantageous. In such a case, there should preferably be provided an encoder or multiplex communication transmitter 405 to change all of the category signals from different positions into a position-category indicating signal, a single transmission line 406, and a decoder or multiplex communication receiver 407 to share into category signals for the respectively corresponding write-in heads 502, as shown in FIG. 3 in place of FIG. 1. Also, the arrangement of FIG. 2 should likewise be modified as shown in FIG. 4, utilizing encoder-decoders or multi-plex communication transmitter-receivers 408 and transmission lines 409.

Figure 5:
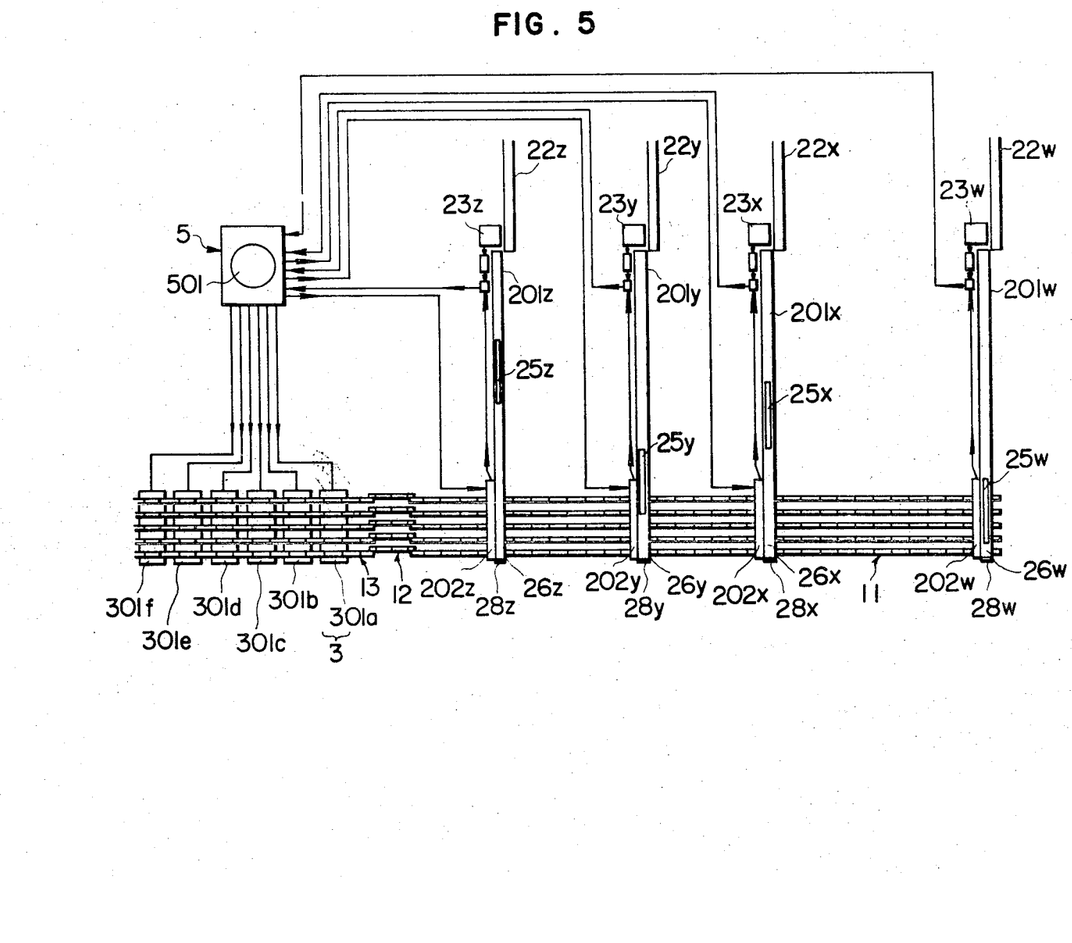
FIG. 5 is a fragmentary plan view, outlining the sawing mill.
Figure 6:
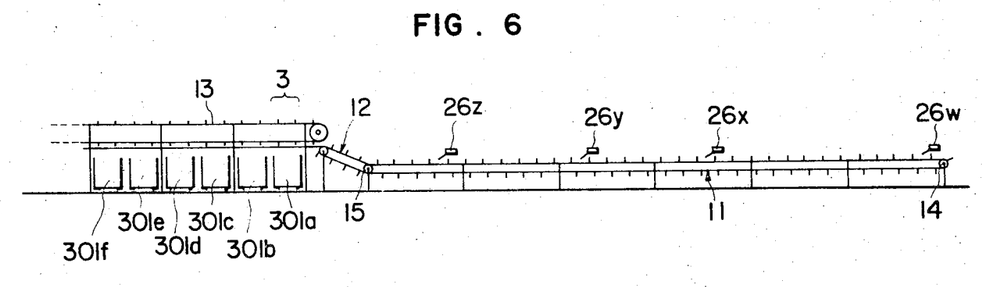
FIG. 6 is a side elevation of the sawing mill shown in FIG. 5.
Figure 7:
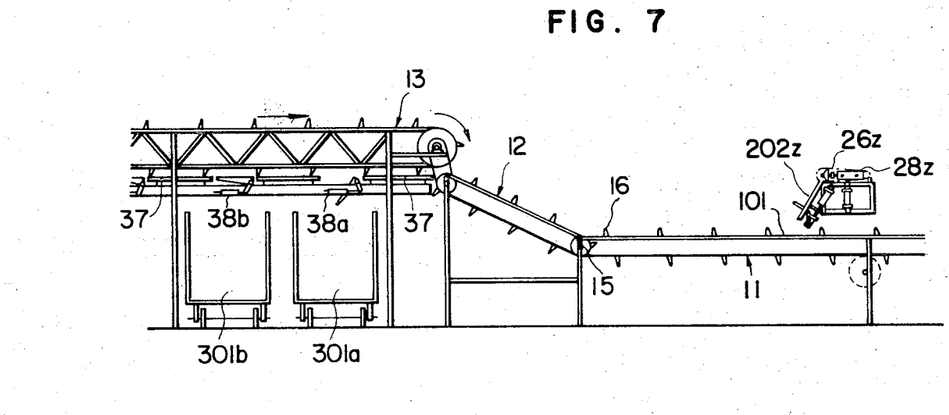
FIG. 7 is a fragmentary gereral view, on an enlarged scale, of the delivery side of the sawing mill shown in FIG. 5.

Next, description will be made on an embodiment by referring to FIGS. 5 through 9. In FIGS. 5 to 7 each sawing unit is provided with a plurality of sawing machines 23w, 23x, 23y and 23z, each including aforesaid category signal initiator therein. These sawing machines may be of an identical type with respect to each other or they may be different in type from each other.

Sawing of logs is performed in such a manner that the operators for the respective sawing machines work to first set — to the required positions — the logs which have been brought thereto via respective log-carrying means, such as roller conveyors 22w, 22x, 22y, and 22z. Then, the operators cut these logs on the respective saws into individual boards 25w, 25x, 25y, and 25z of desired dimensions by means of the sawing machines. In this part of operation, it should be understood that the log is not necessarily cut into boards of the same dimension by the same single sawing machine, for example, by 23w. Nor is there any restriction imposed that the same specific dimensional relationship has to be established between the individual boards which are cut by the respective sawing machines.

Adjacent to the respective sawing machines 23w, 23x, 23y, and 23z, there are provided supply conveyors, such as roller conveyors 201w, 201x, 201y and 201z, which are means for carrying the respective boards from the sawing machines onto the main conveyor 1 which will be described later. These board-carrying means or supply conveyors are preferably of the power driven type. At the farther ends, i.e., downstream ends, of these supply conveyors relative to the respective sawing machines, there are provided temporarily-holding mechanisms 26w, 26x, 26y, and 26z, respectively. The supply conveyors 201w, 201x, 201y and 201z are provided horizontally. It should be understood, however, that they can be inclined as required. These supply conveyors 201w, 201x, 201y and 201z are an example of the plural number of the branch conveyors 201 shown in FIG. 2.

A single main conveyor 11 is provided subjacently of the respective temporarily-holding mechanisms 26w, 26x, 26y and 26z. In this embodiment, the respective supply conveyors 201w, 201x, 201y and 201z are each disposed at right angle relative to the main conveyor 11 at the same one side thereof. It should be understood, however, that these supply conveyors may be arranged obliquely relative to the main conveyor 11 and may be located at the opposite sides thereof, as required.

The individual boards 25w, 25x, 25y and 25z which have been cut by the respective sawing machines 23w, 23x, 23y and 23z are carried away therefrom by their corresponding supply conveyors 201w, 201x, 201y and 201z and the boards are supplied onto the main conveying means 11 via the respective temporarily-holding mechanisms 26w, 26x, 26y and 26z. This main conveyor 11 corresponds to an upperstream half portion of the conveyor means 1 in FIGS. 1 and 2.

The aforesaid respective temporarily-holding mechanisms are in variably of an arrangement which is the same relative to each other in functional principle. Therefore, explanation of these mechanisms will be made hereunder with respect to only one of them for the sake of simplicity.

An individual board which is carried forth edgewise by the supply conveyor 201z is supplied onto the temporarily-holding mechanism 26z. The forward end of the running board 25z hits against a stopper 28z which is provided at one end, i.e., on the side facing the forward end of the running board 25z, of the temporarily-holding mechanism 26z. Whereupon, the detecting means — such as a limit switch not shown — which is provided in the stopper 28z is actuated to dump this board 25z which has arrived at the temporarily-holding mechanism 26z onto a transfer means 202z which, in turn, is provided close and adjacent to one side of this temporarily-holding mechanism 26z. This limit switch has an electric circuit which is arranged to function so that if there is a board which was sent to the transfer means 202z ahead of a subsequent one is still present thereon, any other board which is sent there after the said earlier one will, irrespective of whether it hits against the stopper 28z, not be dumped onto the transfer means, and that only when there is no longer the presence of the earlier board on the transfer means 202z, the limit switch will be actuated to dump the subsequently arriving board onto the transfer means 202z. Arrangement is provided also that, in case there is present an earlier board on the temporarily-holding mechanism 26z, the subsequently arriving board will be kept temporarily on half way of the supply conveyor 201z.

Description has been made of an instance where a limit switch provided on the stopper 28z is used as the detecting means. It should be understood, however, that this detecting means is not limited to a limit switch and that this detecting means need not be provided in the stopper 28z either, provided that the aforesaid functions of the temporarily-holding mechanism is secured. As a substitution of the aforesaid detecting means, there may be employed a pneumatic or other mechanical detecting means or an optical or electric detecting means utilizing a photo-cell or the like.

As the aforesaid main conveyor 11, there may be utilized a roller conveyor or a belt conveyor. It is, however, desirable to use a chain conveyor having spaced partitioning hooks (lugs) as illustrated. The main conveyor of this latter type is designed to make a circulatory movement by being driven, via sprockets 14 and 15, from a driving means not shown, and as stated above, arrangement is provided so that only when there is no earlier board resting on a section of the main conveyor located between two adjacent partitioning lugs 16 and 16, a board is supplied onto this sapce from the aforesaid transfer means 202z. The control means for this performance will be discussed in detail later. However, this part of the apparatus is arranged to be operative so that, when individual boards are to be supplied onto the main conveyor 11 from its adjacent plural number of supply conveyors 201w, 201x, 201y and 201z, only one board will be dumped onto one receiving space or section of this conveyor 11 located between two adjacent partitioning hooks 16 and 16, i.e., onto one hook span or one partition 101, at a time.

The boards which have been supplied to the respective partitions 101, one category in one partition, of the main conveyor 11 are carried along onto the entrance of the unloading stations 3 having subjacently disposed receptacle means 301, such as wheeled board-carriers 301a, 301b, 301c, 301d, 301e and 301f, via a hooked conveyor such as a chain conveyor 12 which can be regarded substantially as a middle part of the main conveyor 1. A receiving conveyor, such as hooked chain conveyor 13, which may be regarded substantially as constituting the downstream portion of the main conveyor 1, passes through the unloading stations 3. Guides 37, 37, ... and sectoral opening and closing mechanisms 38a, 38b, ... are provided, as shown, below this hooked conveyor 13 in such a way that they do not obstruct the rotation of the hooked conveyor 13. This hooked conveyor 13 receives boards, one after another, which have been carried onto the entrance of the unloading stations 3, and therefrom it carries these boards ahead continuously. The aforesaid opening and closing mechanisms 38a, 38b, ... are provided one for each unloading station. These mechanisms are arranged to be in the closed state normally, so that the boards which are carried on these opening and closing mechanisms in their closed state can travel therealong without being dropped therefrom unexpectedly. However, arrangement is provided that, when the board of a certain category arrives on the opening and closing mechanism assigned to that category, this particular mechanism alone will open upon receipt of the signal from the corresponding read-out head.

Figure 8:
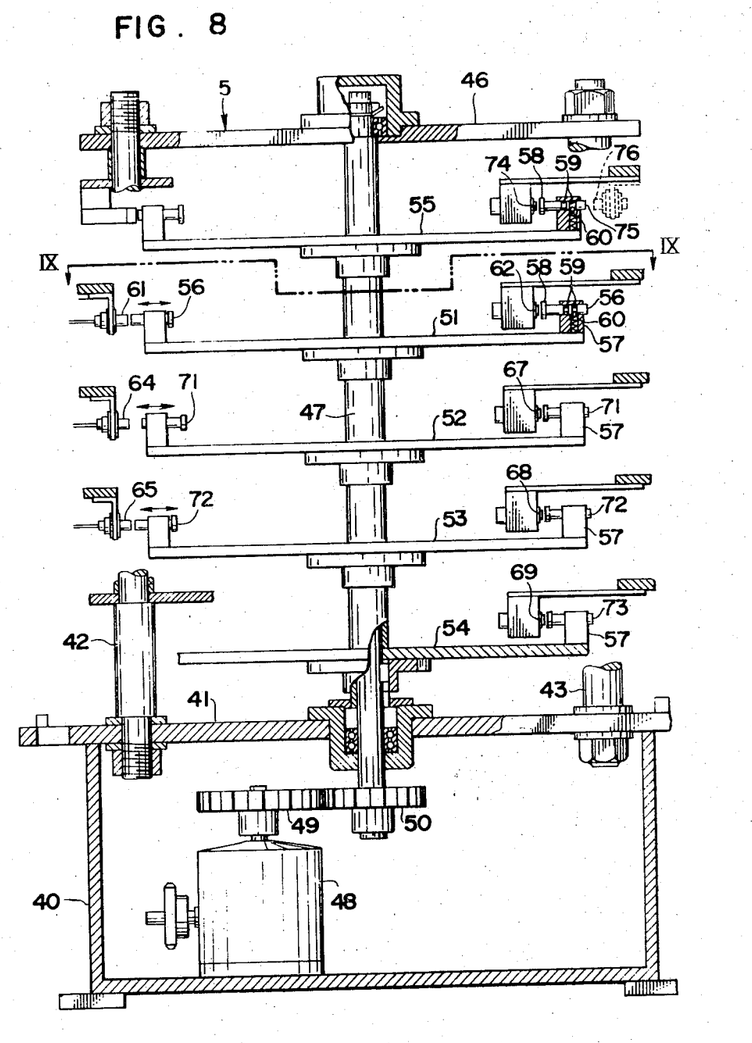
FIG. 8 is an enlarged side elevational view, partly in section and broken away, of the memory means.
Figure 9:
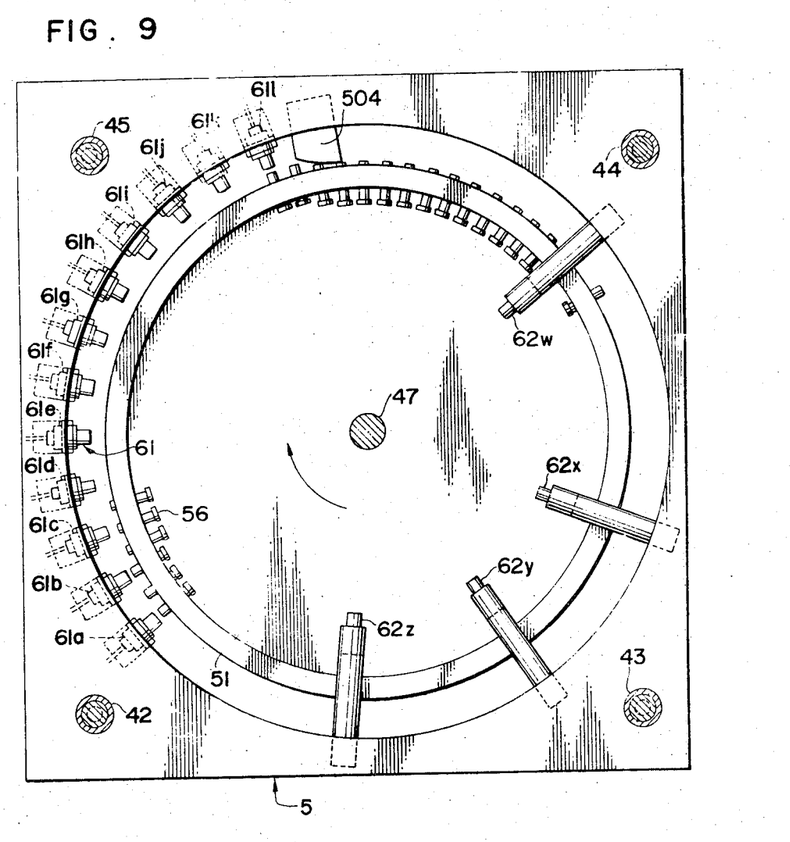
FIG. 9 is a somewhat diagrammatic sectional view taken along the line IX—IX in FIG. 8.

The memory means 5 may be provided separately from the aforesaid sawing units or sawing line. As shown in FIGS. 8 and 9, this memory means 5 has a central rotatable shaft 47 which is rotatably supported vertically by an upper frame panel 41 of a base frame 40 and by a top plate 46 which is fixed to one end of four supporting poles 42, 43, 44 and 45 having other ends fixed to the said upper frame panel 41 at sites close to the four corners of this panel 41. This rotatable shaft 47 is mechanically driven by a driving mechanism 48 — which is provided either on the base frame 40 or at any other appropriate site — via toothed wheels 49 and 50 and in synchronism with the movement of the main conveyor 11, the hooked chain conveyor 12 and the receiving conveyor 13. It should be understood that this driving source may be used as a common driving source for the respective conveyors.

To the rotatable shaft 47 are secured horizontally at appropriate intervals a required number of rotary members, such as disks 51, 52, 53, 54 and 55, which are rotated together with this rotatable shaft 47 as their rotation axis. In this embodiment, there is performed a sorting into 12 different categories, and therefore, 12 kinds of category signals are to be distinctly prepared. Accordingly, if the memory means is to be constructed according to, for example, the binary code system, there will be employed four disks assigned for the digit of 1, digit of 2, digit of 4 and digit of 8, respectively. It should be understood, however, that the construction of the memory means is not limited thereto, and that the number of the disks may be increased or decreased as required in accordance with the number of categories to be sorted. Also, even in the said arrangement, the disks employed therein are not in any way different from those of the present embodiment other than the manner of their assignment which is such, for example, that the disk 51 is assigned for the digit of 1, the disk 52 is assigned for digit 2, the disk 53 is assigned for digit 4, and the disk 54 is assigned for digit 8. Therefore, it will be sufficient here to make an explanation of only one of these four disks.

As shown in FIGS. 8 and 9, in this embodiment illustrated, the disk 51 is provided with annular members for the attachment of a required number of memory pins 56 as memory elements of the memory medium 501 in such a way that these memory pins 56 may be able to slide therethrough in radial directions of this disk 51, the said memory pins having a certain corresponding relationships with the positions of the respective partitions of the conveyor 11, the chain conveyor 12 which is regarded substantially as a part of the main conveyor 1, and a receiving conveyor 13 which is regarded substantially as the rearmost end of the main conveyor 1. So long as the said corresponding relationships which will be discussed in further detail hereunder can be secured, there is no need to uniformalize the intervals at which the respective memory pins are provided on the disk 51. From the aspects of the easiness of manufacture and the operational controllability, it is desirable that the respective memory pins be provided in the same fashion at equal intervals either within a single plane parallel with the surface plane of the disk or in a same single circumferential plane having the said rotatable shaft 47 serving as its central axis. Also, it is desirable that the respective memory pins be arranged to have the same length and to have the same maximum length of projection. In the embodiment illustrated, all of the respective memory pins have the same dimension and are provided at the same intervals within a same single plane parallel with the surface plane of the disk 51, and each has a flange 58 formed at one end of the memory pin 51 on the side proximal to the center of the disk 51 so that once this flange 58 has hit the inner or proximal wall surface of the annular pin-attachment member 57, the memory pin 56 thereafter will never project outwardly any farther, to thereby insure a uniform length of the maximum outward projection of the memory pin radially of the disk 51. It is desirable also to arrange so that a groove 59 as shown in FIG. 8 be formed at an appropriate region of each memory pin 56, and that the pin-attachment member 57 be provided at its inner surface with a protrusion 60 which is elastically engageable in the said groove 59 and slidable therein, whereby to insure that, when the memory pin 56 has been actuated and has moved up to the predetermined position, the pin will not be allowed to make any alteration of this position spontaneously.

A required number of sensing means as read-out heads 503 — corresponding to the number of sorting to be made (12 sensing means are shown in FIG. 9) — for example proximity switches 61a–61l (in FIG. 8, only a representative such switch 61 is shown) are fixedly disposed outside the disk 51 — by utilizing the supporting poles 42, 43, 44 and 45 or by the use of other appropriate members — in concentric relationship with the disk 51 in such a way that these switches will never obstruct the rotation of the disk even when the memory pin 56 is caused to project outwardly for the maximum distance. It is needless to say that in case each memory pin 56 is disposed horizontally, i.e., on a same single circumferential plane parallel with the surface plane of the disk 51 which is a rotary member provided at right angle relative to the rotatable shaft 47, the said sensing members also are arranged on the said circumferential plane and that these sensing means have to be provided close to the memory pins 56 in such a degree as will not obstruct the movements of both the disk 51 and the respective memory pins 56.

In the same manner, by utilizing the supporting poles 42, 43, 44 and 45 or by the use of other appropriate members, there are fixedly arranged — concentrically with the disk 51 and at constant intervals, namely, with a corresponding relationship with the intervals with which the temporarily-holding mechanisms are provided — a required number of memory pin actuating means, such as air-nozzles 62w–62z (only a representative air-nozzle 62 is shown in FIG. 6), in a number identical with the number of the sites (transfer means 202) at which boards to be sorted are supplied onto the main conveyor 1, i.e., as many as the temporarily-holding mechanisms. Needless to say, these air-nozzles 62w–62z have to be arranged so that they will not be brought into contact with any of the respective memory pins 56 in their maximum retreated positions, but as close as possible to these memory pins and also that they have to be provided on the side opposite to the proximity switches, with the memory pins intervening therebetween. In the example illustrated, the respective air-nozzles 62w–62z are disposed on the inner side of the memory pins 56 concentrically with the disk 51. In case the memory pins 56 are provided radially relative to the rotatable shaft 47 as stated previously, it is necessary that the air-nozzles 62w–62z and the proximity switches 61a–61l be disposed within that same single circumferential plane in which the memory pins 56 are disposed, in such a way as to satisfy the aforesaid relationships.

The respective proximity switches 61a–61l do not particularly have to be disposed at equal intervals. However, from the aspect of easy manufacturability and from the convenience in the control of operation, it is desirable that they be disposed at equal intervals. In the same sense, the hook spans, i.e., partitions or compartments 101, of the respective conveyors 11, 12 and 13 desirably are of an equal length, respectively. This is because of the fact that there can be secured easily good corresponding relationships between the respective conveyors 11, 12, 13, the respective memory pins 56 and the respective proximity switches 61a–61l. However, the positional relationship between the respective air-nozzles 62w–62z and the respective proximity switches 61a–61l need only be corresponding to each other so that the distance covered by a board from the site (transfer means) at which the board is supplied onto the main conveyor 11 by being transferred from, for example, the 1st temporarily-holding mechanism up to the 3rd receptacle 301c is in corresponding agreement with the distance covered by the revolving movement of the memory pin which has been forced to project by virtue of the 1st air-nozzle 62w till it arrives at the 3rd proximity switch 61c which is one of such switches disposed in a row in the direction of rotation of the disk 51.

Furthermore, as shown in FIG. 9, there is provided a cam 504 as an eraser head adjacent to and spaced from the final proximity switch 61l of the series of such switches disposed in the direction of rotation of the disk 51, and this cam 504 is assigned to cause the memory pins 56 which have been actuated to project by the actuating means to restore their initial normal positions.

The other three disks 52, 53 and 54 may be arranged in exactly the same way as the one 51. Their respective sensing means 64, 65 and 66 of which 66 is not shown and their respective actuating means 67, 68 and 69 (as write-in heads) may also be arranged in a number and positional relationship same as those for the disk 51. It should be understood, however, that positional relationships of these elements may be appropriately altered between the respective disks 51, 52, 53 and 54 so long as such positional relationship between the actuating means and the sensing means as stated previously in connection with the disk 51 can be secured. Also, in the example illustrated, the respective disks 51, 32, 53 and 54 employed are of the same diameter. It should be understood also that they may be disks having different diameters relative to each other and that, instead of the use of disks of a required number, there may be used a single cylindrical body equipped with a required number of sets of memory pins, each set having a required number of memory pins. It is needless to say that there have to be provided a required number of both actuating means and sensing means corresponding in number to the memory pins of the respective sets.

Description of the disk 55 will be made later. Hereunder will be described the operation of the memory means 5 which is of the construction as stated above. Let us now assume that a button (not shown) for designating the thickness of the board to be sawed of a sawing machine 23z including a category signal initiator is depressed to obtain boards having a specific dimension — mainly thickness — from a log. Whereupon, the category signal initiator of the sawing machine 23z — which initiator being electrically connected to the said button — is so set as to produce a signal representing the category of the boards or the dimension into which the boards are to be cut, and then the signal is stored in the connected shift register.

The sawed board is then carried by the supply conveyor 201z to be supplied onto the temporarily-holding mechanism 26z. During this course of supply, the board will bump into the stopper 28z of this temporarily-holding mechanism 26z and will be supplied onto the transfer means 202z and therefrom the board will be dumped onto a section between two adjacent hooks (lugs) 16 and 16 of the main conveyor 11. Whereupon, a signal that the said board is loaded on the main conveyor 11 from the supply conveyor, i.e., a branch conveyor, 201z is generated by the transfer means 202z (including a transfer detector 403 therefor) to be transmitted to the corresponding transfer gate. Whereupon, the gate is opened to transfer the category signal registered in the shift register to the corresponding write-in head in the memory means 5. The write-in head for writing the category signal is undertaken by the first air-nozzle 62z of the specific disks among the four disks 51, 52, 53 and 54 so that each air-nozzle 62z is opened to eject a jet of air stream therefrom at such a timing exactly as per the category signal registered in the shift register, to cause the memory pins of the said specific disks project outwardly. As these projecting memory pins approach the designated proximity switches which are provided close to these respective disks, the said memory pins will actuate these proximity switches to form electric circuits for actuating the opening and closing mechanism of the required receiving unit. Thus, a required board is caused to drop from the main conveyor onto the intended receptacle.

More specifically, let us now assume that a log is to be sawed by the 1st sawing machine 23w into individual boards 25w which are to be received by the 3rd receiving unit 301c. As the first step, a log is set at a required position on the said sawing machine 23w. Then, the 3rd button for obtaining the specific thickness (a category "C") of the board intended for the board intended for the 3rd receiving unit 301c is depressed. In accordance with the depression of this button, the category signal initiator produces the category signal "C", which is then stored in the connected shift register. The sawed board 25w is carried by the supply conveyor 201w and is loaded onto the temporarily-holding mechanism 26w so that the edge of this board 25w hits against the stopper 28w of this holding mechanism 26w and is dumped therefrom onto the transfer means 202w. Thereafter, the board 25w is loaded onto a partition 101, i.e., between two adjacent hooks 16 and 16, of the main conveyor 11. During this part of operation, the aforesaid signal "C" and the limit switch of the stopper 28w are utilized or any other appropriate detecting means is utilized so that the 1st air-nozzle 62w of the disk 51 assigned for the digit 1 and the 1st air-nozzle 67w (not shown) of the disk 52 assigned for the digit 2 are opened to cause the memory pins 56 and 71 of these respective disks to project outwardly. These two projecting memory pins 56 and 71 will progressively approach the proximity switches as these disks 51 and 52 are rotated. When the said memory pins 56 and 71 are positioned close to the specific proximity switches corresponding to the memorized category signal, i.e., 1 + 2 + 0 + 0 = 3 (representing "C"), the opening and closing mechanism 38c (not shown in FIG. 9, but to be provided next to 38b) of the 3rd unloading station which corresponds to these specific proximity switches is opened so that the board 25w is allowed to drop into the receptacle of the said receiving unit 301c.

Description will hereunder be made on the disk 55 assigned for confirming the presence or absence of a board in a hook span 101 of the main conveyor 11. It should be understood that the actuating means, for example the air-nozzles 74, for this disk 55 may be arranged in exactly the same manner as those for the aforesaid four disks 51, 52, 52 and 54. Also, the number of the air-nozzles 74 is not any different from that of the said four disks. The memory pins 75 can be the same in all respect as those of the said four disks. However, the number of the proximity switches 76 may be one less than the number of the air-nozzles 74, or in other words, it may be one less than the number of the temporarily-holding mechanisms. This is because the temporarily-holding mechanism (in the example illustrated, it is 26w) which is positioned in the extreme upper stream of the main conveyor 11 does not require a proximity switch for detecting empty partitions. The respective air-nozzles 74 and the respective proximity switches 76 should be disposed so as to be operative with the following relationship of timing such that the positions of both the air-nozzles and the proximity switches relative to the rotation speed of the detection disk 55 corresponds to the positions of the loading stations (transfer means) relative to the travelling main conveyor 11. It is a matter of course that the respective proximity switches 76 have to be provided at such appropriate positions as are suitable for being actuated by the projecting pin 75, and this is in no way different from the positioning of those proximity switches for the aforesaid four disks.

Description will next be directed to the operation of this detection disk 55 in further detail. Let us now assume that a board 25w is supplied from the 1st temporarily-holding mechanism 26w onto the main conveyor 11. Whereupon, the limit switch of the stopper 28w of this temporarily-holding mechanism 26w or any other appropriate detecting means of the said holding mechanism 26w is actuated to cause air to eject from the 1st air-nozzle to have one of the memory pins 75 project outwardly. As this memory pin 75 approaches the proximity switches of the 2nd, 3rd and 4th temporarily-holding mechanisms 26x, 26y and 26z, these respective proximity switches are actuated to temporarily suspend the supply of subsequent boards from the said respective temporarily-holding mechanisms 26w, 26y and 26z onto the main conveyor 11. In other words, in case there is an earlier board present in any of the hook spans 101 of the main conveyor 11 no subsequent board will be supplied onto the said hook span 101. When the earlier board has passed the site at which another board is to be supplied from a temporarily-holding mechanism located down-stream, the board-supplying operation by the said specific temporarily-holding mechanism is resumed, and a board is supplied onto the hook span 101 of the main conveyor which is empty having no board thereon.

As stated above, the provision of the detection disk 55 is convenient in case there are a plurality of supply sources of objects communicating with the main conveyor 11. It should be understood, however, that this disk 55 need not be provided in case there is only one supply source of objects to be sorted out. In this latter instance, the sorting operation can be accomplished by the use of the aforesaid four disks without any difficulty.

As will be understood from the foregoing statement, the present invention requires only those operators assigned for supplying block-type objects onto the supply conveyor or conveyors for subsequent sorting. The sorting operation is performed automatically and efficiently by remote control operation. Moreover, according to the present invention, there is provided, at a low cost, a sorting apparatus having a simplified structure and causing little disorder and erroneous behavior to occur.

No description has been made as to the details of the connections of the electric circuits of the memory means which constitutes a part of the essential mechanisms of the apparatus of the present invention. It should be understood, however, that various kinds of electric circuits which are suitable for this memory means may be easily constructed by those skilled in the art.

What is claimed is:

1. A method for automatically sorting block-type objects, comprising:
    supplying said objects onto a plurality of supply means provided separately from the said conveyor means and assigned for carrying the objects onto said conveyor means,
    loading the objects of various catagories on said conveyor means at different positions without the objects being superposed one upon another,
    at the same time with said supplying registering the category signal information corresponding to the categories of the supplied objects in a shift register for each of said plurality of supply means and in the order of the supplies affected,
    registering, at the time of said respective loading, signals indicative of the categories of the loaded objects to such positions in a memory means as correspond to the positions of the sections of the conveyor at which time said objects are loaded,
    at the time of loading rearranging the registered signal in said memory means in the order with which the individual objects are loaded on the conveyor means, and
    unloading the said objects off the said conveyor means, the signals coming from the said memory means when the said objects being carried on the said conveyor means arrive at designated sites classified according to the respective predetermined categories of the objects.

2. A method according to claim 1, in which the said block-type objects consist of boards different in size which have been sawed from logs by a plurality of sawing machines provided in spaced relations with each other.

3. A method according to claim 1, in which the said block-type objects consist of boards different in size which have been sawed from logs by a plurality of sawing machines provided in spaced relations with each other.

4. An apparatus for automatically sorting block-type objects, comprising:
    a main conveyor means having a plurality of partitions for carrying the objects to be sorted;
    a plurality of branch conveyor means for carrying the objects toward said main conveyor means;
    a plurality of transfer means each one provided at the end of each of said branch conveyor means for transfering the objects from said each branch conveyor means to said main conveyor means;
    a plurality of unloading stations provided in the way of said main conveyor means, and each including a receptacle and delivery means for removing the object from said main conveyor means to said receptacle;
    a plurality of category signal generators each including a category signal initiator corresponding to each of said branch conveyor means for generating a signal indicative of the category of the object loaded on said each branch conveyor means, a shift register connected to said category signal initiator for storing the category indicative signals in the order they come from said initiator, a transfer detector associated with the corresponding one of said transfer means for generating a gating signal upon transfer of the object from the corresponding branch conveyor means to said main conveyor means, and a transfer gate connected both to said shift register and said transfer detector for delivering the earliest stored category indicative signal from said shift register upon receipt of said gating signal; and
    memory means including memory medium travelling synchronously with said main conveyor means, a plurality of write-in heads each connected to each said transfer gate for writing said category indicative signal delivered therefrom on said memory medium, a plurality of read-out heads each assigned to respective one category for reading signals indicative of the assigned category out of all said category indicative signals written on on said memory medium, and empty detector heads provided in pairs with said write-in heads except the frontmost one and connected to the respectively corresponding ones of said transfer means for prohibiting the transfer of the object when said empty detector head does not detect an empty signal, each of said read-out heads being connected to the corresponding one of said delivery means for removing the object from said conveyor means to the corresponding receptacle when said each read-out head reads from said memory medium a signal of its assigned category, the positional relationship between said write-in heads plus said read-out heads and said memory medium being the same as the positional relationship between said transfer means plus said unloading stations and said main conveyor means.

5. An apparatus according to claim 4, in which said apparatus further comprises:
    receiving means having unloading stations in a number at least corresponding to the number of the categories of the objects to be sorted and being provided at designated sites downstream of the said conveyor means, and
    means provided in the said memory means for generating signals to actuate, in synchronism with the travel of the said conveyor means, opening and closing means provided on the said receiving units.

6. An apparatus for automatically sorting block-type objects, comprising:
    conveyor means having a plurality of partitions for carrying the objects,
    a plurality of loading stations provided in the way of said conveyor means and at which are loaded the objects on the partitions of said conveyor means,
    a plurality of unloading stations provided in the way of said conveyor means and each including a receptacle and delivery means for removing the object from said conveyor means to said receptable, a plurality of category signal generators provided each corresponding to one of said plurality of loading stations for generating a signal indicative of the category of the object loaded thereat, memory means including memory medium travelling synchronously with said conveyor means, a plurality of write-in heads each connected to each of said plurality of category signal generators for writing said category indicative signal on said memory medium, and a plurality of read-out heads each assigned to respective one category for reading signals indicative of the assigned category out of all said category indicative signals written on said memory medium, each of said read-out heads being connected to the corresponding one of said delivery means for removing the object from said conveyor means to the corresponding receptacle when said each read-out head reads from said memory medium a signal of its assigned category, the positional relationship between said plurality of write-in heads plus said read-out heads and said memory medium being the same as the positional relationship between said plurality of loading stations plus said unloading stations and said conveyor means, said memory means further including:

spaced rotary members rotatable with their rotatable central shaft driven from a driving means, a required number of spaced memory members having slidable memory pins and being fixed radially on the circumferential peripheries of the said rotary members in a corresponding positional relations to the positions of the partitions formed on the conveyor means so that these memory members are revolved together with the rotary members in synchronism with the shifting in position of the said partitions caused by the travel of the conveyor means, actuating means for actuating the said slidable memory pins, the said actuating means being fixed separately from the said memory members but positioned close enough to the said memory pins to face these pins and so as not to obstruct the sliding movement of the memory pins and spaced from each other in corresponding relationships to the number and the positions of the sites of the said supply means, sensing means fixed separately from the said memory members to face the said memory pins in a number and at positions corresponding to those of the said receiving units, the said actuating means being adapted to sense the actuated memory pins as the latter approach quite close thereto and to generate signals to open the normally closed opening and closing means for the receiving units when the objects of specific categories arrive at their corresponding unloading stations to thereby allow these objects to be received in their receptacles, receiving means having unloading stations in a number at least corresponding to the number of categories of the objects to be sorted and being provided at designated sites down-stream of the said conveyor means, and means provided in the said memory means for generating signals to actuate, in synchronism with the travel of the said conveyor means, opening and closing means provided for the said receiving units.

7. An apparatus according to claim 6, in which the said apparatus further comprises:

driving means for synchronizing the travel of the said conveyor means with the signal-generating timing of the said memory means, and power transmitting means formed with mechanical members for transmitting power from the said driving means to the said conveyor means and to the said memory means.

8. An apparatus according to claim 6, in which:

with respect to one of the rotary members, the said sensing means are provided to face the memory pins in a number and at positions corresponding to those of the supply means, and with respect to the remaining rotary member, the said sensing means are provided to face the memory pins in a number and at positions corresponding to those of the unloading stations.

9. An apparatus according to claim 6, in which:

the said actuating means are air-nozzles.

10. An apparatus according to claim 6, in which:

the said memory pins have a longitudinal groove for slidably engaging with elastic projections extending from pin-attachment pieces of the memory members to prevent casual alteration of the operating positions of the memory pins when these pins are actuated to assume these operating positions.

11. An apparatus according to claim 6, in which:

a cam means is provided for each of the said rotary members separately therefrom and positioned adjacent to the rearmost sensing means relative to the direction of rotation of the rotary member to engage the memory pins in their operating positions to thereby cause them to resume their initial positions from their operating positions.

* * * * *